United States Patent [19]

Burg

[11] Patent Number: 4,864,795
[45] Date of Patent: Sep. 12, 1989

[54] STRUCTURAL FRAMEWORK SYSTEM AND CLAMP ASSEMBLY

[75] Inventor: Robert J. Burg, Hartsdale, N.Y.

[73] Assignee: Uni Corp., Bronx, N.Y.

[21] Appl. No.: 53,035

[22] Filed: May 22, 1987

[51] Int. Cl.$^4$ .............................................. F16B 7/08
[52] U.S. Cl. .................................... 523/646; 403/174; 403/175; 403/312
[58] Field of Search ............... 135/106, 109; 285/179, 285/373; 211/189, 182; 403/175, 391, 313, 3, 171, 218; 52/646, 654

[56] References Cited

U.S. PATENT DOCUMENTS

| D. 157,594 | 10/1948 | Hollaender | D54/1 |
|---|---|---|---|
| D. 275,075 | 8/1984 | Magner | D8/382 |
| 998,904 | 7/1911 | Jacobs . | |
| 1,150,781 | 8/1915 | Louden | 403/218 |
| 1,166,688 | 1/1916 | Hornby . | |
| 1,195,889 | 8/1916 | Willeford . | |
| 1,261,213 | 4/1918 | Clay . | |
| 1,914,555 | 6/1933 | Connelly . | |
| 2,839,320 | 6/1958 | Hill . | |
| 2,840,400 | 6/1958 | D'Azzo . | |
| 3,021,159 | 2/1962 | Back . | |
| 3,069,189 | 12/1962 | Hollaender . | |
| 3,074,203 | 1/1963 | Paksy | 403/171 |
| 3,834,549 | 9/1974 | Burg et al. | 211/148 |
| 3,887,291 | 6/1975 | Langren | 403/391 |
| 3,901,613 | 8/1975 | Anderson | 403/406 |
| 3,999,727 | 12/1976 | Rennemann | 244/118 R |
| 4,030,610 | 6/1977 | Alexander | 211/182 |
| 4,209,099 | 6/1980 | Wickes | 211/182 |
| 4,283,152 | 8/1981 | Smith et al. | 403/3 |
| 4,421,434 | 12/1983 | Magner | 403/175 |
| 4,600,232 | 7/1986 | Phillips | 296/3 |

FOREIGN PATENT DOCUMENTS

| 229642 | 2/1963 | Austria . | |
|---|---|---|---|
| 526717 | 6/1956 | Canada | 211/182 |
| 1201443 | 9/1965 | Fed. Rep. of Germany . | |
| 1287983 | 8/1962 | France . | |
| 419599 | 4/1947 | Italy . | |
| 768890 | 2/1957 | United Kingdom | 403/218 |

Primary Examiner—John E. Murtagh
Attorney, Agent, or Firm—Fitzpatrick, Cella, Harper & Scinto

[57] ABSTRACT

A structural framework assembly (150) is made up of framework subassemblies (102, 104, 104', etc.) interconnected by elongated horizontal structural members (122, 124, 126, 128, etc.). The subassemblies are made up of elongated structural members (114, 116, 118, 120) interconnected by clamping assemblies (106, 108, 110, 112). The clamping assemblies are made up of clamp elements (20a, 20b) with recesses (28, 30) which extend part way around the structural members and third portions (26) with cylindrical recesses (36) in which the ends of other elongated structural members are locked.

19 Claims, 5 Drawing Sheets

STRUCTURAL FRAMEWORK SYSTEM AND CLAMP ASSEMBLY

BACKGROUND OF THE INVENTION

1. Field of the Invention

This invention relates to structural framework systems and more particularly it concerns novel clamp elements, clamp assemblies, frame assemblies and frame assemblies which can be readily disassembled and reassembled in various configurations.

2. Description of the Prior Art

Clamped framework assemblies have proven to be especially desirable for many applications because of their high strength and ease of assembly and disassembly. Also, clamped framework assemblies can be reconfigured quite readily for various applications, including formation of shelves, supports, display racks, false ceilings, etc.

One particularly advantageous structural framework system is the Powerclamp ® structural tube and fitting system sold by Uni Corp., 50 Manida Street Bronx, N.Y. and shown and described in Uni Corp catalog C-200. That system comprises a plurality of elongated framework members arranged in a three dimensional grid formation and clamped together at their intersections by special clamping assemblies. Each clamping assembly comprises a plurality of clamp elements. The clamp elements are formed with recesses whose inner surfaces extend part way around and conform to the outer surface configuration of the elongated members. Fastening means, such as bolts, extend between clamp elements on opposite sides of the elongated members and hold the clamp elements tightly to the elongated members.

In the construction of a three dimensional grid type framework assembly, clamping assemblies must be provided which will accommodate elongated structural members extending in three orthogonal directions from the clamping assembly. In the past, this has required at least three clamp elements in each assembly; and at least one of the clamp elements had to be formed with recesses extending in three different directions. Also, two sets of fastening means were required to operate in different clamping directions on the same clamping element. This contributed substantially to the cost and complexity of the clamping system.

Other clamped framework systems and clamping assemblies are shown and described in U.S. Pat. Nos. 998,904, 1,166,688, 1,261,213, 3,021,159, 4,283,152, 4,421,434, Des. 157,594, and Des. 275,075 as well as Austrian Pat. No. 229,642, French Patent No. 1,287,983 and Italian Patent No. 419,599.

U.S. Pat. No. 998,904 shows bifurcated clamp arrangements but not a three dimensional framework system. U.S. Pat. No. No. 1,166,688 shows a setscrew type clamping assembly with a single clamp element. U.S. Pat. No. 1,261,213 shows two element clamp arrangements but not a three dimensional clamp assembly. U.S. Pat. No. 3,021,159 shows clamping assemblies with split clamp elements which are flexible and squeezed around elongated members. U.S. Pat. No. 4,283,152 shows two element clamping assemblies but not a three dimensional framework system. U.S. Pat. No. 4,421,434 shows a multiple element clamping assembly for a three dimensional framework system but the clamping assembly requires at least three elements for a three dimensional intersection and at least one of these elements is subjected to clamping forces in two different directions. U.S. Pat. No. Des. 157,594 shows a two dimensional coupling arrangement but no clamping. U.S. Pat. No. Des. 275,075 shows a clamping assembly like that shown in U.S. Pat. No. 4,421,434. Austrian Patent No. 229,642 and French Patent No. 1,287,983 shows two element clamping arrangements for a three dimensional framework system but the clamping elements themselves only clamp in two dimensions and they are held together, in part, by the action of elongated members extending in a third dimension. Italian Patent No. 4,419,599 shows bifurcated clamping assemblies but not a three dimensional framework assembly.

SUMMARY OF THE INVENTION

The present invention provides novel and improved clamp elements, clamping assemblies, structural framework subassemblies and structural framework assemblies. The novel clamp elements can be manufactured easily and economically with a high degree of precision to ensure reliable clamping. The novel clamping assemblies are capable of clamping elongated elements which extend in three dimensions and yet they require fewer pieces than has heretofore been necessary. The novel framework subassemblies are characterized by their ability to be prefabricated and then packed closely together for convenient and economical shipment to a designated site where they can be integrated into an overall framework structure with a minimum of effort. The novel framework assembly of the present invention is characterized by high strength and ease of disassembly and ready reassembly into various configurations.

According to one aspect of the invention there is provided a novel clamp element for use in clamping elongated members to extend along first, second and third axes from a common intersection. This novel clamp element comprises a single integral structure having first, second and third portions. The first and second portions each have, formed therein, respectively, first and second recesses extending respectively, along the first and second axes. Each recess forms a clamping surface extending part way around its respective axis. The first recess extends uninterruptedly through the clamp element and the second recess extends out to the end of the second portion. A formation is located intermediate the first and second recesses for accommodating a fastener. The third portion of the clamp element extends along the third axis in a direction away from the first recess. The third portion is formed to engage the end of an elongated member extending along the third axis. Means are also provided for locking one end of an elongated member to the third portion.

According to a second aspect of the invention there is provided a novel clamping assembly for clamping together elongated members to extend along first, second and third axes from a common intersection. This novel clamping assembly comprises first and second clamp elements each comprising a single integral structure having at least two portions. The first and second portions of each structure each have formed therein, respectively, first and second recesses extending, respectively, along the first and second axes. Each of these recesses form a clamping surface which extends part way around their respective axes. The first recess extends uninterruptedly through the clamp element and the second recess extends out to the end of the second portion. A formation is located intermediate the recesses of each clamp element for accommodating a fastener. The recesses of each clamp element face each other. A fastener element extends between the formation of each clamp element to draw the clamp elements toward each other. At least one of the clamp elements has a third portion extending along the third axis in a direction away from the first recess of the one clamp element. The third portion is formed to engage the end of an elongated member extending along the third axis. Means are provided for locking the one end of the elongated tubular member to the third portion.

According to a third aspect of the present invention there is provided a novel structural framework subassembly. This subassembly comprises a plurality of elongated structural members lying in a flat plane and forming a closed figure. A clamping assembly is located at each intersection of the elongated structural membrane. Each clamping assembly includes first and second clamp elements each comprising a single integral structure having at least first and second portions. The first and second portions of each structure have formed therein respectively, first and second recesses extending, respectively, along first and second intersecting axes. These recesses each form a clamping surface extending part way around its respective axis. The first recess extends uninterruptedly through the clamp element and the second recess extends out to the end of the second portion. A formation is located intermediate the first and second recesses of each clamp element for accommodating a fastener. The recesses of the clamp elements in each clamp assembly face each other and extend part way around the periphery of different ones of the elongated structural members. A fastener element extends between the formations of the clamp elements of each clamping assembly and holds the clamp elements tightly together with the different ones of the elongated structural members clamped tightly in the recesses. At least some of the clamp elements have a third portion formed to engage one end of a further elongated members extending along axes out of the flat plane of the subassembly; and means are provided for locking one end of further elongated structural members to each of the third portions.

According to a fourth aspect of the present invention there is provided a novel structural framework assembly. This novel assembly comprises a plurality of framework subassemblies, each of which in turn comprises a plurality of elongated structural members lying in a flat plane and forming a closed figure. A clamping assembly is located at each intersection of the elongated structural members in each subassembly. Each clamping assembly includes first and second clamp elements and each clamp element comprises a single integral structure having at least two portions. The first and second portions of each structure have formed therein, respectively, first and second recess extending, respectively, along first and second intersecting axes. Each recess forms a clamping surface extending part way around its respective axis. The first recesses extends uninterruptedly through the clamp element and the second recess extends out to the end of the second portion. A formation is located intermediate the recesses of each clamp element for accommodating a fastener. The recesses of the clamp elements in each clamping assembly face each other and extend part way around the periphery of different ones of the elongated structural members. A fastener element extends between the formations of the clamp elements of each clamping assembly and holds the clamp elements tightly together with different ones of the elongated structural members clamped tightly in the recesses. The framework subassemblies are spaced apart from each other and at least some of the clamp elements on the sides of the respective framework subassemblies facing each other have a third portion engaging and locked to further elongated structural members extending between two framework subassemblies. Means are provided for locking the opposite ends of the further elongated structural members to the third portions.

In each aspect the third portion of the clamp element is preferably formed with a third recess with an internal surface surrounding and extending along the third axis and opening out at the end of the third portion.

The invention also involves additional aspects which, as will be appreciated from the following detailed description of the preferred embodiments, provide further advantages and novel structure.

DETAILED DESCRIPTION OF THE PREFERRED EMBODIMENTS

Figure 1A:
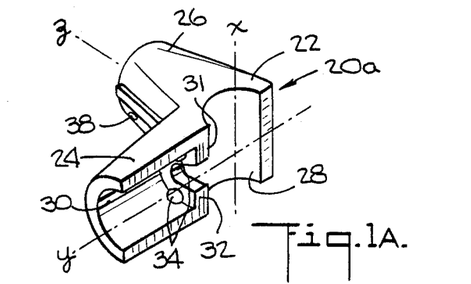
FIGS. 1A, 1B and 1C are perspective views of clamp elements used in two forms of a clamp assembly according to the present invention.

As shown in FIG. 1A, a clamp element 20a comprises a single integral structure formed of suitable material, such as aluminum or iron, preferably by die casting. The clamp element 20a has a central portion 22 and two projecting portions 24 and 26. The central and first projecting portions 22 and 24 each have a semi cylindrical recess, 28 and 30, extending along a different one of two orthogonal axes x and y. The inner surfaces of the recesses 28 and 30 are clamping surfaces and conform to the shape of the outer surfaces of elongated members to be clamped. In this case the elongated members are tubular or cylindrical. In cases where the elongated members have other cross sectional shapes the recesses 28 and 30 would be shaped accordingly.

The recess 28 extends uninterruptedly through the central portion 22 of the clamp element 20a and opens axially from the structure at both ends of the central portion. The recess 30 extends along the first projecting portion 24 and opens axially from the structure at its outer end but terminates short of the recess 28. Abutment formations 31 and 32 are located intermediate the recesses 28 and 30. The abutment formations are provided with through holes 34 which extend perpendicularly to both the x and y axes. These through holes accommodate fasteners, such as bolts (not shown) which hold the clamp element 20a to a corresponding clamp structure.

Figure 1B:
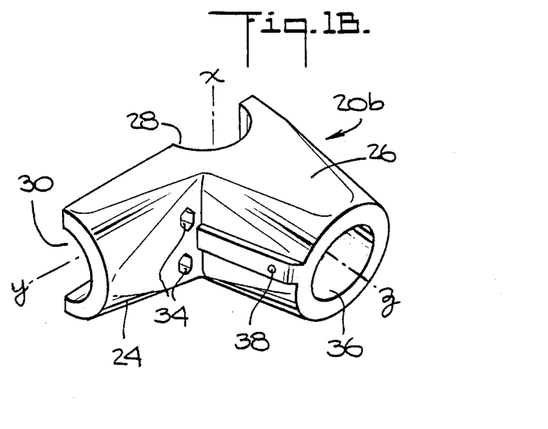

The second projecting portion 26 of the clamp element 20a extends along the z axis on the side of the structure opposite the recess 28. As can be seen in FIG. 1B, which shows an identical clamp element 20b from the opposite side, the second projecting portion 26 is formed with a cylindrical recess 36 having an inner surface which surrounds and extends along the z axis. The recess 36 terminates at one end inside the projecting portion 26 short of the recess 28; and it open at its other end at the end of the projecting portion. A threaded setscrew opening 38 is provided along the second projecting portion 26 for a setscrew (not shown) to lock the end of a tubular element in the recess 36.

Figure 1C:
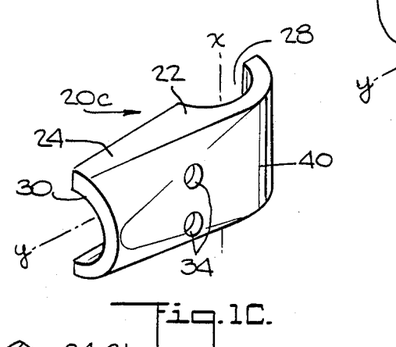

FIG. 1C shows a clamp element 20c which can be used with one of the elements 20a and 20b. The element 20c differs from the elements 20a and 20b in that it has no second projecting portion and instead is formed with a curved outer surface 40 which parallels the recess 28. The clamp 20c per se is not novel.

Figures 2, 3, 8, 9:
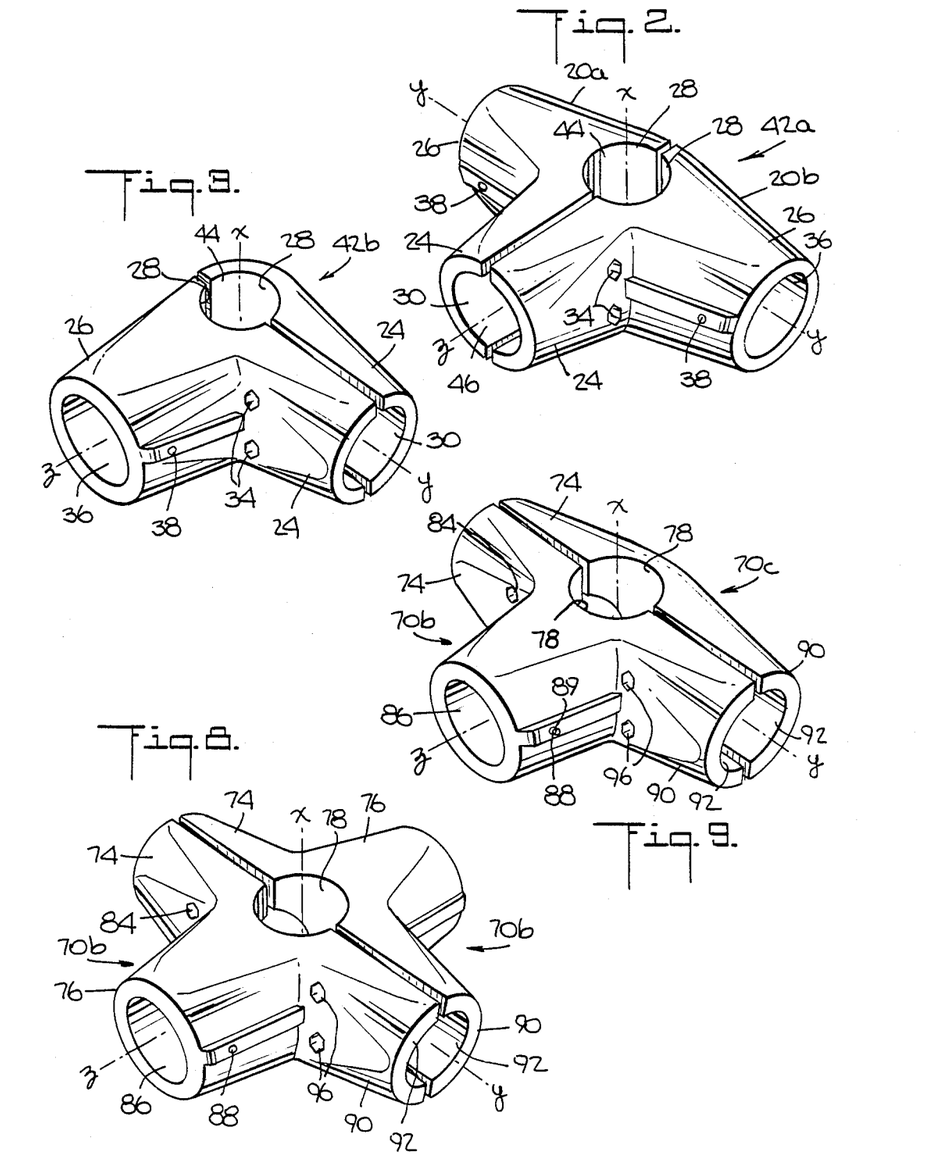
FIG. 2 is a perspective view of a first clamp assembly according to the present invention.
FIG. 3 is a perspective view of a second clamp assembly according to the present invention.
FIG. 8 is a perspective view of a third clamp assembly according to the present invention.
FIG. 9 is a perspective view of a fourth clamp assembly according to the present invention.

The clamp element 20a of FIG. 1A may be used with the clamp element 20b of FIG. 1B to form a double sided clamp assembly 42a as shown in FIG. 2. As can be seen, this clamp assembly permits the clamping of an elongated member which extends through the assembly in both directions along the x axis. The two recesses 28 of the clamp elements 20a and 20b face each other and together form an almost complete cylindrical space 44 along the x axis to accommodate an elongated member to be clamped. Also the two recesses 30 of the clamp elements 20a and 20b face each other and together form an almost complete cylindrical space 46 along the y axis to accommodate the end of a second elongated member to be clamped. The two cylindrical recesses 36 of the portions 26 of the clamp elements 20a and 20b each individually completely surround and accommodate the end of associated elongated members along the z axis.

In an alternative arrangement, the clamp element 20a of FIG. 1A may be used with the clamp element 20c of FIG. 1C to form a single sided clamp assembly 42b as shown in FIG. 3. In this assembly, the recesses 28 and 30 of the clamp elements 20a and 20c form spaces 44 and 46 for clamping elongated members extending along the x and y axes but only the clamp element 20a has a second projecting portion 26 with a cylindrical recess 36 for accommodating the end of an elongated member extending along the z axis.

Figure 4:
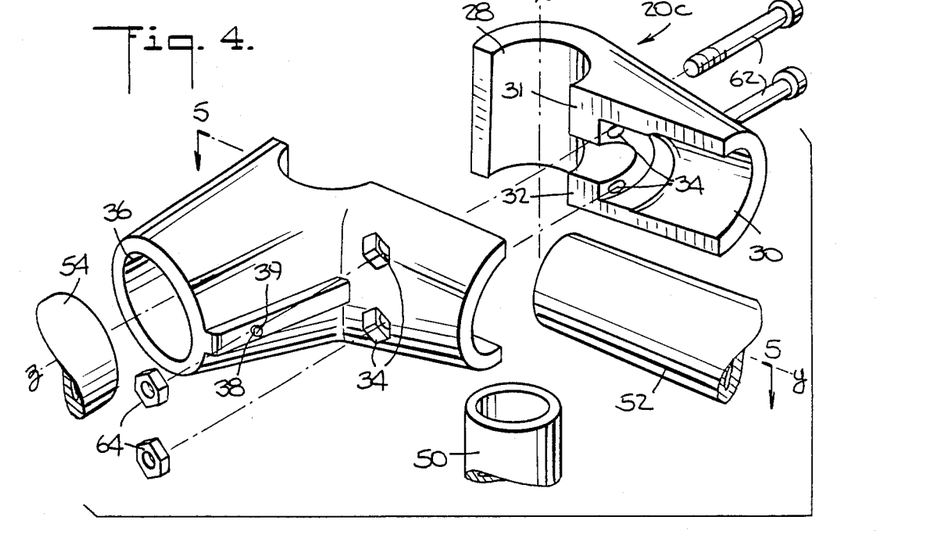
FIG. 4 is a exploded perspective view of the clamp assembly of FIG. 3, showing the manner in which it is used to clamp elongated members extending in three dimensions.
Figures 5, 6:
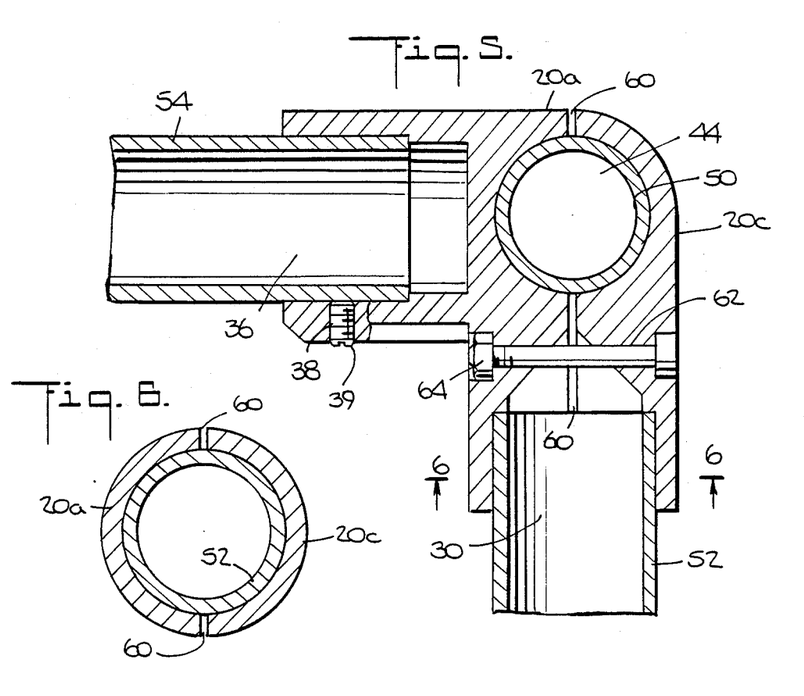
FIG. 5 is a section view taken along lines 5—5 of FIG. 4 but showing the clamp assembly in its assembled condition.
FIG. 6 is a section view taken along line 6—6 of FIG. 5.

FIGS. 4–6 show the connection of the clamp assembly of FIG. 3 to associated elongated members. In this example, first, second and third elongated tubular members 50, 52 and 54, which extend respectively along the x, y and z axis are clamped together by the clamp assembly. As can be seen in FIGS. 4 and 5, clamp elements 20a and 20c are positioned such that their respective semi-circular recesses 28 and 30 face each other to form cylindrical passages 56 and 58 having the same curvature as the tubular members 50 and 52. The recesses 28 and 30 however do not quite extend half way around the tubular members and therefore the clamp elements are held slightly apart from each other by the tubular members 50 and 52 with a gap 60 therebetween as shown in FIGS. 5 and 6.

A pair of bolts 62 extend through the through holes 34 in the abutment formations 31 and 32 of the two clamp elements 20a and 20c. There bolts are secured by nuts 64 to hold the clamp elements tightly against the tubular members 50 and 52. As can be seen in FIG. 5, the bolts 62 are located between the tubular members 50 and 52. Also, even though the tubular members extend along different axes, the direction of clamping is the same for both members, i.e. along the axis of the bolts 62. Therefore as the nuts 64 are tightened on the bolts, a lever action is produced, with the bolts acting as the fulcrum, to distribute the stress on the bolts substantially equally on both the tubular members 50 and 52. This provides an exceptionally strong and reliable camping action.

The third tubular member 54, as shown in FIGS. 4 and 5 has its end inserted into the cylindrical recess 36 of the clamp element 20a. The recess 36 preferably has a size and shape to provide a loose sliding fit with the end of the tubular member 54; and it may be counterbored or reamed as shown in FIG. 5 to provide such fit. A setscrew 66 is threaded into the setscrew opening 38 of the clamp element 20a and its end abuts the side of the tubular member 54 inside the recess 36. This locks the tubular member 54 to the clamp assembly.

It will be seen that the clamping action produced on the tubular members 50 and 52 by tightening the nuts 64 on the bolts 62 is essentially independent of the clamping action produced on the tubular member 54 by tightening the setscrew 66. Thus, for example, if there should be some difference in the diameter of the tubular members 50 and 52 or some discrepancy in the sizes of the recesses 28 and 30 of the clamp elements 20a or 20c, the clamping action produced by the bolts 62 and nuts 60 remains unaffected because any resulting shift in alignment of the cylindrical recess 36 will be accommodated by the loose sliding fit of the tubular member 54 in the recess 36. Moreover the action of the setscrew 66 which holds the tubular member 54 in the recess 36 will have no effect on the clamping action produced on the tubular members 50 and 52.

The clamp assembly of FIG. 2 can accommodate an elongated member, extending along the x axis, anywhere along the length of the member; and it can also accommodate the ends of two elongated members extending in opposite directions along the y axis as well as the ends of two elongated members extending in opposite directions along the z axis. The clamp assembly of FIG. 3 is identical to the clamp assembly of FIG. 2 except that it is designed to accommodate only one elongated member extending along the z axis.

Figure 7A:
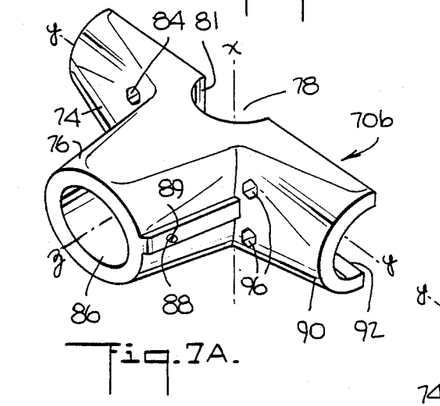
FIGS. 7A, 7B, and 7C are perspective views of clamp elements used in two further forms of a clamp assembly according to the present invention.
Figure 7B:
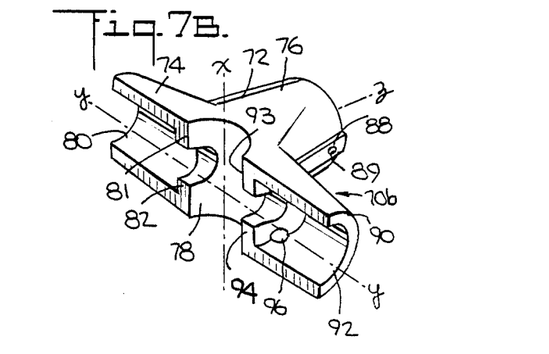

FIGS. 7A and 7B show clamp elements 70a and 70b which are identical to each other and which are similar to the clamp elements 20a and 20b of FIGS. 1A and 1B. The clamp elements 70a and 70b each have a central portion 72 and first and second projecting portions 74 and 76, with the central and first projecting portions 72 and 74 each formed with a semi cylindrical recess 78 and 80 extending along a different one of orthogonal axes x and y. The inner surfaces of the recesses 78 and 80 are clamping surfaces and conform to the shape of the outer surfaces of elongated member to be clamped.

The recess 78 extends uninterruptedly through the clamp element 70a and opens axially at both ends. The recess 80 extends along the portion 74 (FIG. 7B) and opens axially at its outer end but terminates short of the recess 78. Abutment formations 81 and 82 are located intermediate the recesses 78 and 80. These abutment formations are provided with holes 84 to accommodate clamping bolts.

The third potion 76 of the clamp elements 70a and 70b extends along the z axis on the side of the respective element opposite the recess 68. The third portion 76 is formed with a cylindrical recess 86 having an inner surface which surrounds and extends along the z axis. The recess 86 terminates at one end inside the third portions 76 short of the recess 78; and it opens at its other end at the end of the third portion. A threaded setscrew opening 88 is provided along the third portion 76 to accommodate a setscrew 89.

The clamp elements 70a and 70b each have a third projecting portion 90 which extends along the y axis in a direction opposite the first projecting portion 74. The third projecting portion 90 is also formed with a semicircular recess 92 which extends along the y axis and opens axially from the structure at its outer end but terminates short of the recess 78. Further abutment formations 93 and 94 are located intermediate the recesses 92 and 78. These second abutment formations are provided with through holes 96 which extend perpendicularly to both the x axis and the y axis. These through holes accommodate further clamping bolts (not shown).

When the clamp elements 70a and 70b are assembled, as shown in FIG. 8 the resulting clamping assembly can accommodate an elongated member, extending along the x axis, anywhere along the length of the member; and it can also accommodate the ends of two elongated members extending in opposite directions along the y axis, as well as the ends of two elongated members extending in opposite directions along the z axis. Very strong and reliable clamping is produced on the elongated members extending along the x axis and the y axis. The locking action produced by setscrews on the elongated members extending along the z axis is not so strong but, because the setscrew clamping action is isolated from that produced on the elongated members extending along the x axis and the y axis, it does not compromise the integrity of the clamping produced on those members.

Figure 7C:
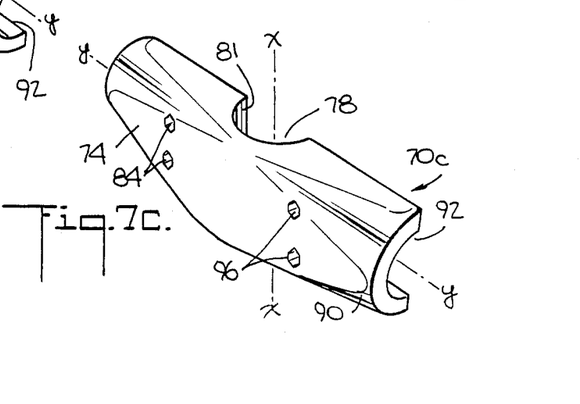

FIG. 7C shows a further clamping element 70c which is like the clamping elements 70a and 70b except that the second projecting portion and its associated cylindrical recess are eliminated. Thus the outer surface of the element extends uninterruptedly between the first and third projecting portions 74 and 90. The clamping element 70c may be used with one of the elements 70a or 70b to form the clamping assembly shown in FIG. 9. This assembly can accommodate an elongated member, extending along the x axis, anywhere along its length; and it can accommodate the end of two elongated members extending in opposite directions along the y axis. However the clamping assembly of FIG. 9 will accommodate only one elongated member extending along the z axis.

Figure 10:
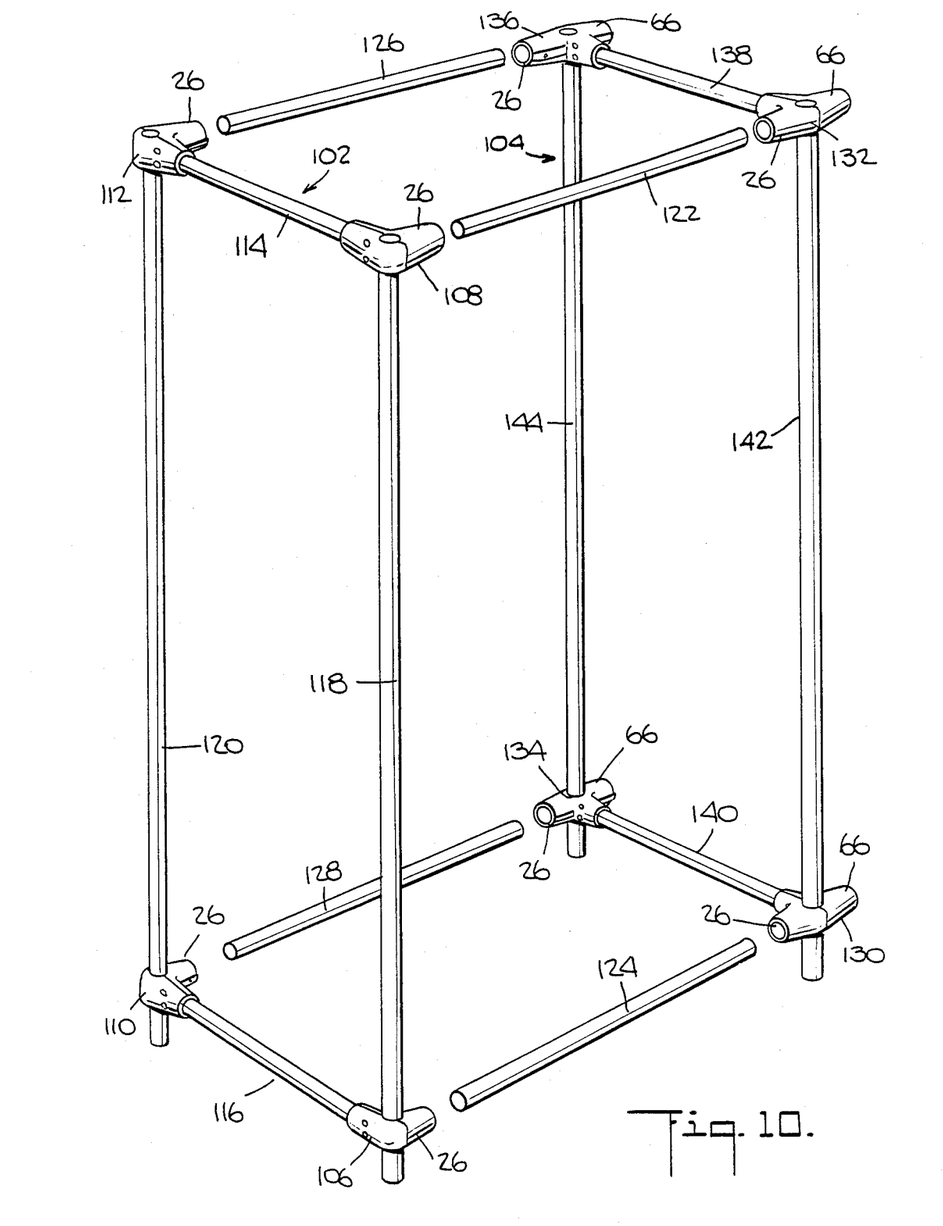
FIG. 10 is a perspective view of a pair of framework subassemblies according to the present invention.

FIG. 10 shows a pair of rectangular framework subassemblies 102 and 104 according to the present invention. The subassembly 102 comprises four clamp assemblies 106, 108, 110 and 112 of the type shown in FIGS. 3–6, as well as upper and lower horizontal elongated tubular members 114 and 116 and first and second vertical elongated tubular members 118 and 120. The first vertical elongated tubular member 118 extends through and is clamped in the recesses 28 of the clamp assemblies 106 and 108, while the second vertical elongated tubular member 120 extends through and is clamped in the recesses 28 of the clamp assemblies 110 and 112. The upper horizontal elongated tubular member 114 extends between and has its ends clamped respectively in the recesses 30 of the clamp assemblies 108 and 112 while the lower horizontal member 116 extends between and has its ends clamped respectively in the recesses 30 of the clamp assemblies 106 and 110.

Because of the leverage action produced by the bolts 62 as above explained, the clamp assemblies 106, 108, 110 and 112 produce a very strong clamping force on the elongated members and they are held together on a rigid two dimensional i.e. flat plane, rectangular structural framework subassembly in the form of a closed loop with a clamping assembly at each intersection around the loop. As can be seen, the second projecting portions 26 of the clamp elements 20a extend parallel to each other on one side of the framework subassembly 102 so that their cylindrical recesses can accommodate elongated members 122, 124, 126 and 128 extending in a direction perpendicular to the plane of the subassembly 102.

The framework subassembly 104 is of similar construction to that of the subassembly 102 except that the subassembly 104 uses clamp assemblies 130, 132, 134 and 136 of the type shown in FIG. 9 to clamp horizontal elongated tubular members 138 and 140 and vertical tubular members 142 and 144. Thus the clamp assemblies 130, 132, 134 and 136 of the framework subassembly 104 have third projecting portions 66 which extend in opposite directions perpendicular to the plane of the subassembly 104, to accept the ends of the elongated members 122, 124 126 and 128 on one side of the subassembly and further elongated members (not shown) in similar manner on the opposite side of the subassembly.

The subassemblies 102 and 104 can be preassembled and packed together for easy shipment to a predetermined location. Because the subassemblies 102 and 104 are essentially two dimensional they do not take up much space in shipment.

Figure 11:
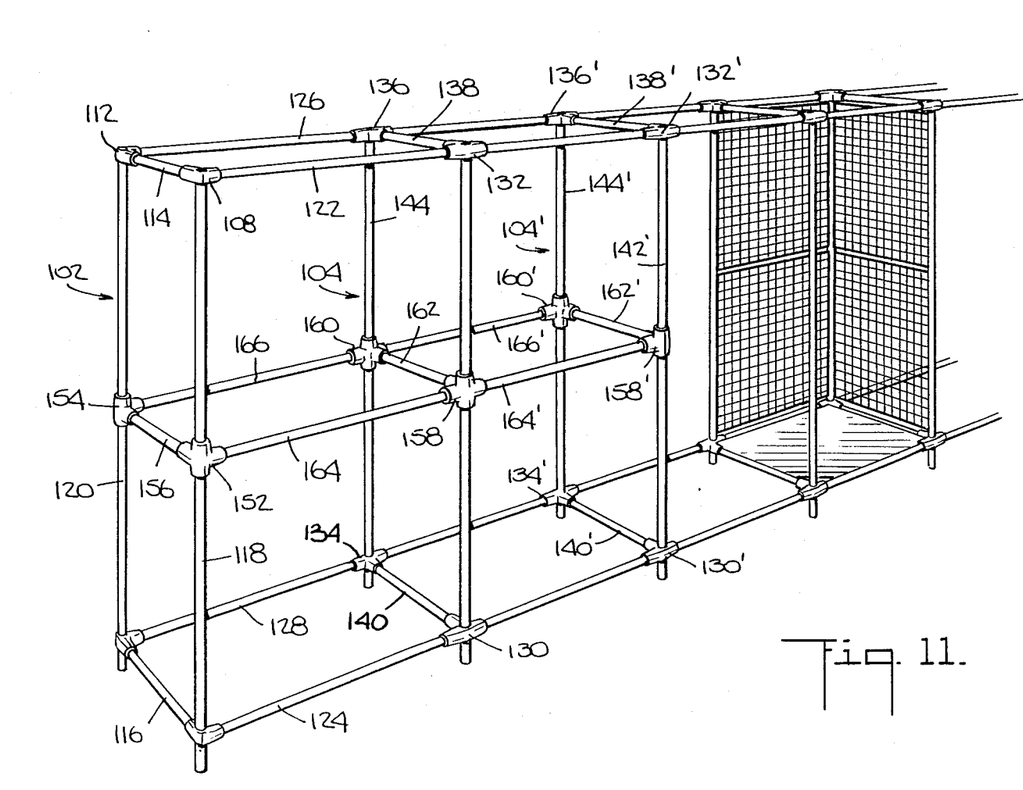
FIG. 11 is a perspective view of a framework assembly according to the present invention.

The subassemblies 102 and 104 may be connected together as shown in FIG. 11 to form a three dimensional framework assembly 150. The framework assembly 150 is assembled by inserting one end of the elongated members 122, 124, 126 and 128 into the cylindrical recesses 36 of the clamp assemblies 106, 108, 110 and 112 of the framework subassembly 102 and the other ends of the elongated members 122, 124, 126 and 128 into the cylindrical recesses 86 of the clamp assemblies 130, 132, 134 and 136 of the framework subassembly 104. When the ends of the elongated members 122, 124, 126 and 128 are inserted into their respective cylindrical recesses 36 and 86, the setscrews 66 and 89 are tightened to hold the elongated members in the cylindrical recesses, thus forming the three dimensional framework assembly 150. Additional framework subassemblies 104 and associated elongated members 122', 124', 126' and 128' are connected together in the same manner to extend the framework assembly 150 as desired.

The framework subassembly 102, as shown in FIG. 11, may also be provided with clamp assemblies 152 and 154 similar to and intermediate the clamp assemblies 106, 110 and 108, 112 along the vertical elongated tubular members 118 and 120 to hold an intermediate horizontal elongated tubular member 156. Similarly, the framework subassemblies 104 and 104' may be provided with intermediate clamp assemblies 158, 158' and 160, 160' similar to and intermediate the clamp assemblies 130, 132 and 134, 136 along the vertical elongated tubular members 142 and 144 to hold intermediate horizontal tubular members 162 and 162'. Also additional horizontal tubular members 164, 164' and 166, 166' may be provided between the third portions of corresponding ones of the clamping assemblies 158, 158' and 160, 160' with the ends of these members fitted into and locked in the cylindrical recesses of these clamping assemblies.

It will be appreciated that because of the high strength of the subassemblies 102, 104, 104' etc. the overall framework structure 150 is made very sturdy even though the horizontal members connecting the subassemblies together are merely locked by means of setscrews in the cylindrical recesses of the clamping assemblies. Because of this feature it is possible to rapidly disassemble the framework structure and rapidly reassemble it in any desired configuration without compromising the strength of the reassembled structure. Also because each clamping assembly has only two clamp elements the clamping and unclamping operation can be carried out conveniently and quickly. It will also be appreciated that the clamp elements themselves are of simple geometric configurations and are readily adapted to manufacture by inexpensive and reliable die casting operation.

The clamp arrangements disclosed herein also permit the formation of structural framework assemblies which incorporate electrical wiring. In such case the elongated tubular members are hollow and contain electrical wires. Also at the clamp assemblies the wires may extend through the spaces between the abutments 31, 32 (FIG. 1A) or between the abutments 93, 94 (FIG. 7B) in passing from one elongated member to another. Also, suitable openings (not shown) may be formed to extend between the recess of the third portion of the clamp members and the other recesses for accommodating such wiring.

I claim:

1. A clamp element for use in clamping elongated members to extend along first, second and third axes from a common intersection, said clamp element comprising a single integral structure having first, second and third portions, the first and second portions having formed therein, respectively, first and second recesses extending, respectively, along said first and second axes and each recess forming a clamping surface extending part way around its respective axis, said first recess extending uninterruptedly through the clamp element and said second recess having an outer end which opens out at the end of said second portion and an inner end inside said second portion, an abutment formation located intermediate said first recess and the inner end of said second recess and formed with a bolt hole extending therethrough in a direction perpendicular to both the first and second axes for accommodating a fastener bolt to hold both said first and second recesses tightly clamped to first and second elongated members, the third portion extending from the first portion along said third axis in a direction away from the first recess, said third portion being formed with a third recess having an internal surface surrounding and extending along said third axis and opening out at the end of said third portion to accommodate the end of an elongated member extending along said third axis, said third portion being formed with a threaded setscrew opening to accommodate a setscrew for locking one end of a third elongated member within said third recess independently of the clamping action produced at said first and second recesses.

2. A clamp element according to claim 1 wherein said third axis is perpendicular to said first and second axes.

3. A clamp element according to claim 1 wherein said third recess is cylindrical.

4. A clamp element according to claim 1 wherein said third recess is aligned with said third axis.

5. A clamp element according to claim 1 wherein clamp element includes a fourth portion extending from said first portion along said second axis in a direction away from said second portion, said fourth portion being formed with a recess extending along said second axis and opening out at the outer end of said fourth portion.

6. A clamp assembly for clamping together elongated members to extend along first, second and third axes from a common intersection, said clamping assembly comprising first and second clamp elements each comprising a single integral structure having at least two portions, the first and second portions of each structure each having formed therein, respectively first and second recesses extending respectively, along said first and second axes and each recess forming a clamping surface extending part way around its respective axis, the first recess extending uninterruptedly through the clamp element and the second recess having an outer end which opens out at the end of said second portion and an inner end inside the second portion, abutment formations located intermediate the first recess and the inner end of the second recess of said clamp elements and formed with a bolt hole extending therethrough for accommodating a fastener to extend in a direction perpendicular to both the first and second axes of the respective clamp elements, the respective first and second recesses of each clamp element facing each other and a fastener element extending through the bolt holes of each clamp element to draw the clamp elements toward each other with their first and second recesses tightly clamped, respectively, to first and second elongated members, at least one of the clamp elements having a third portion extending from the first portion along said third axis in a direction away from said first recess of said one clamp element, said third portion being formed with a third recess with an internal surface surrounding and extending along said third axis, said third recess opening out at the end of said third portion to accommodate the end of a third elongated member extending along said third axis and a setscrew threaded into said third portion and extending into said third recess, for locking said end of said elongated member within said third recess independently of the clamping action produced at said first and second recesses.

7. A clamping assembly according to claim 6 wherein said first axis is perpendicular to said first and second axes.

8. A clamping assembly according to claim 6 wherein said third recess is cylindrical.

9. A clamping assembly according to claim 6 wherein said third recess is aligned with said third axis.

10. A clamping assembly according to claim 6 wherein the other clamp element has a third portion extending along said third axis in a direction opposite that of the third portion of said one clamp element, the third portion of the other clamp element being formed to engage the end of a further elongated member extending along said third axis, and means for locking said one end of further elongated tubular member in the third recess of said other clamp element.

11. A clamping assembly according to claim 10 wherein each clamp element includes a fourth portion extending from said first portion along said second axis in a direction away from said second portion, said fourth portion being formed with a recess extending along said second axis.

12. A structural framework subassembly comprising a plurality of elongated structural members lying in a flat plane and forming a closed figure, a clamping assembly located at each intersection of said elongated structural members, each clamping assembly including first and second clamp elements, each comprising a single integral structure having at least two portions, the first and second portions of each structure having formed therein, respectively, first and second recesses extending, respectively, along first and second intersecting axes and each recess forming a clamping surface extending part way around its respective axis, the first recess extending uninterruptedly through the clamp element and the second recess having an outer end which opens out at the end of said second portion at an inner end inside the second portion, each said structure having an abutment formation located intermediate its first recess and the inner end of its second recess and formed with a bolt hole extending therethrough for accommodating a fastener to extend in a direction perpendicular to both the first and second axes of the respective clamp element, the respective first and second recesses of the clamp elements in each clamp assembly facing each other and extending part way around the periphery of different ones of said elongated structural members, a fastener element extending through the bolt holes in the abutment formations of the clamp elements of each clamping assembly and holding said clamp elements tightly together with said different ones of said elongated structural members clamped tightly in said recesses, at least some of said clamp elements having a third portion extending from the first portion thereof along a third axis in a direction away from its respective first recess, said third portion being formed with a third recess with an internal surface surrounding and extending along said third axis, said third recess opening out at the end of said third portion to accommodate therein one end of a further elongated structural member extending along said third axis out of said flat plane and a setscrew threaded into said third portion and locking said one end of said further elongated structural member to said third portion independently of the clamping action produced by said first and second recesses, respectively on said first and second elongated members.

13. A structural framework subassembly according to claim 12 wherein said third portions extend in a direction perpendicular to said flat plane.

14. A structural framework subassembly according to claim 12 wherein said elongated structural members and said recesses are cylindrical in shape.

15. A structural framework subassembly according to claim 12 wherein both elements of each clamping assembly include a third portion formed with a third recess and means for locking one end of a further elongated structural member in said third recess.

16. A structural framework assembly comprising a plurality of framework subassemblies, each of said subassemblies comprising a plurality of elongated structural members lying in a flat plane and forming a closed figure, a clamping assembly located at each intersection of said elongated structural members in each subassembly, each clamping assembly including first and second clamp elements, each comprising a single integral structure having at least two portions, the first and second portions of each structure each having formed therein, respectively, first and second recesses extending, respectively, along first and second intersecting axes and each recess forming a clamping surface extending part way around its respective axis, the first recess extending uninterruptedly through the clamp element and the second recess having an outer end which opens out at the end of said second portion and an inner end inside the second portion, said structure having an abutment formation located intermediate its first recess and the inner end of its second recess and formed with a bolt hole extending therethrough for accommodating a fastener to extend in a direction perpendicular to both the first and second axes of the respective clamp element, the respective first and second recesses of the clamp elements in each clamp assembly facing each other and extending part way around the periphery of different ones of said elongated structural members, a fastener element extending through the bolt holes in the formations of the clamp elements of each clamping assembly and holding said clamp elements tightly together with different ones of said elongated structural members clamped tightly in said recesses, said framework subassemblies being spaced from each other, at least some of the clamp elements on the sides of the respective framework subassemblies facing each other and each having a third portion extending from the first portion along a third axis in a direction away from its respective first recess, each said third portion being formed with a third recess with an internal surface surrounding and extending along a third axis and accommodating therein one end of said further elongated structural member and a setscrew extending into said third portion and locking said one end of said further elongated element to said third portion independently of the clamping action produced by said first and second recesses, respectively, on said first and second elongated members.

17. A structural framework assembly according to claim 16 wherein each third axis is perpendicular to the plane of its respective framework subassembly.

18. A structural framework assembly according to claim 16 wherein said elongated tubular members have the same outer configuration as the recesses in which they are clamped.

19. A structural framework assembly according to claim 29 wherein said third recesses are cylindrical in shape.

* * * * *

UNITED STATES PATENT AND TRADEMARK OFFICE
CERTIFICATE OF CORRECTION

PATENT NO. : 4,864,795
DATED : September 12, 1989
INVENTOR(S) : ROBERT J. BURG

Page 1 of 3

It is certified that error appears in the above-identified patent and that said Letters Patent is hereby corrected as shown below:

ON THE TITLE PAGE,
AT [56] REFERENCES CITED

Other Prior Art, insert --Catalog. No. C-200 entitled "Power Clamp Structural Tube and Fitting System" of Uni Corp.--.

IN THE DRAWINGS,
SHEET 5 OF 5

Fig. 11, reference numerals 122', 124', 126' and 128' should be added with lead lines, respectively to the longated members aligned, respectively, with the members 122, 124, 126 and 128.

Fig. 11, reference numerals 106 and 110 should be added with lead lines to the unnumbered lowermost and and second lowermost clamps, respectively at the left end of the drawing.

Fig. 11, reference numeral 150 should be added with an arrow headed lead line to the entire structure.

COLUMN 2

Line 12, "4,419,599" should read --419,599--.

UNITED STATES PATENT AND TRADEMARK OFFICE
CERTIFICATE OF CORRECTION

PATENT NO. : 4,864,795

DATED : September 12, 1989

INVENTOR(S) : ROBERT J. BURG

It is certified that error appears in the above-identified patent and that said Letters Patent is hereby corrected as shown below:

COLUMN 3

Line 18, "elongated structural membrane." should read
        --elongated structural member.--.
    Line 40, "a" should be deleted.
    Line 57, "first and second recess" should read
        --first and second recesses--.

COLUMN 4

Line 30, "a" should read --an--.

COLUMN 5

Line 20, "open" should read --opens--.

COLUMN 6

Line 7, "There" should read --These--.
    Line 19, "camping" should read --clamping--.
    Line 38, "nuts 60" should read --nuts 64--.

COLUMN 7

Line 7, "third potion 76" should read
        --third portion 76--.
    Line 13, "portions 76" should read --portion 76--.

UNITED STATES PATENT AND TRADEMARK OFFICE
CERTIFICATE OF CORRECTION

PATENT NO. : 4,864,795
DATED : September 12, 1989
INVENTOR(S) : ROBERT J. BURG

Page 3 of 3

It is certified that error appears in the above-identified patent and that said Letters Patent is hereby corrected as shown below:

COLUMN 8

Line 36, "members 122, 124 126 and 128" should read
--members 122, 124, 126 and 128--.

COLUMN 10

Line 57, "said, first axis" should read
--said third axis--.

COLUMN 12

Line 59, "claim 29" should read --claim 18--.

Signed and Sealed this

Fifteenth Day of October, 1991

Attest:

HARRY F. MANBECK, JR.

*Attesting Officer*    *Commissioner of Patents and Trademarks*